US011303630B2

(12) United States Patent
Dedieu et al.

(10) Patent No.: US 11,303,630 B2
(45) Date of Patent: Apr. 12, 2022

(54) METHOD FOR OPENING A SECURE SESSION ON A COMPUTER TERMINAL

(71) Applicant: Evidian, Les Clayes-sous-Bois (FR)

(72) Inventors: Gérard Dedieu, Bezons (FR); David Cossard, Bezons (FR); Boksic Rodrigo, Bezons (FR)

(73) Assignee: BULL SAS, Les Clayes-sous-Bois (FR)

( * ) Notice: Subject to any disclaimer, the term of this patent is extended or adjusted under 35 U.S.C. 154(b) by 179 days.

(21) Appl. No.: 16/712,064

(22) Filed: Dec. 12, 2019

(65) Prior Publication Data

US 2020/0220867 A1 Jul. 9, 2020

(30) Foreign Application Priority Data

Dec. 12, 2018 (FR) ...................... 1872786

(51) Int. Cl.
*H04L 29/06* (2006.01)

(52) U.S. Cl.
CPC ...... *H04L 63/0853* (2013.01); *H04L 63/0435* (2013.01); *H04L 63/0442* (2013.01); *H04L 63/0838* (2013.01); *H04L 63/0876* (2013.01); *H04L 63/102* (2013.01); *H04L 63/20* (2013.01)

(58) Field of Classification Search
None
See application file for complete search history.

(56) References Cited

U.S. PATENT DOCUMENTS

| 11,066,164 | B1* | 7/2021 | Tsong | H04L 63/0823 |
| 2005/0278538 | A1* | 12/2005 | Fowler | H04L 63/102 |
| | | | | 713/182 |
| 2014/0157430 | A1* | 6/2014 | McDowell-White | ...... |
| | | | | H04L 63/0876 |
| | | | | 726/27 |
| 2015/0310431 | A1 | 10/2015 | Lakshmanan et al. | |
| 2015/0339665 | A1* | 11/2015 | Hayhow | G06Q 20/38 |
| | | | | 705/71 |
| 2016/0070894 | A1 | 3/2016 | Boodaei | |
| 2018/0331837 | A1 | 11/2018 | Uhr et al. | |

OTHER PUBLICATIONS

Search Report as issued in French Patent Application No. 1872786, dated Aug. 1, 2019.
Goossens, F., "How to protect user logins from WordPress & Co. with two-factor authentication," Retrieved from the Internet: URL: https://www.hosteurope.de/blog/benutzer-login-mit-zwei-faktor-authentifizierung/, XP055610189, [Retrieved on Jul. 31, 2019], Jan. 2017, 17 pages.

* cited by examiner

*Primary Examiner* — Piotr Poltorak
(74) *Attorney, Agent, or Firm* — Arc IP Law, PC; Joseph J. Mayo

(57) ABSTRACT

A method for initiating a secure session using a smartphone as a physical token to provide strong authentication. The phone is used through a public and independent real-time notification service. The notifications are exchanged in an encrypted manner so that their content is only accessible to the mobile phone and the authentication server.

7 Claims, 2 Drawing Sheets

METHOD FOR OPENING A SECURE SESSION ON A COMPUTER TERMINAL

CROSS-REFERENCE TO RELATED APPLICATIONS

This application claims the benefit of French Patent Application No. 1872786 filed Dec. 12, 2018, the disclosure of which is herein incorporated by reference in its entirety.

TECHNICAL FIELD OF THE INVENTION

The invention relates to a method for initiating a secure session on a computer terminal.

The field of the invention is that of authentication for the initiating of sessions on computer terminals. More specifically, the field of the invention is that of so-called enhanced authentication.

For the purposes of this document, a computer terminal is any computer device that allows a user to interact with network or local resources at the terminal. This refers in particular to personal computers, also known as PCs, Macs, or workstations, whether fixed or portable. The list is not exhaustive. Tablet computers, hybrid tablet and PC devices, and smartphones (mobile phones including a hand-held computer) are also referred to here.

A mobile terminal is to be understood as a smartphone. Depending on the role attributed to it, a smartphone may fulfill the role of a computer terminal or the role of a mobile terminal. However, for this invention, the same physical device may not have both of these roles.

PRIOR ART

In the field of professional activities, and increasingly in the field of domestic activities, access to a computer resource is preceded by an authentication operation.

It is necessary to be authenticated to access a computer terminal, i.e. to initiate a session on a computer, and/or to access an e-mail service or more generally an application. An application is local or accessible through a web browser. This authentication consists of entering an identifier and a password. The entry of the identifier and the password is, secured using an encrypted transmission protocol, or the entry of the identifier and the password is not secured. One example is the use of the HTTPS protocol.

For computer terminals, enhanced authentication solutions based on the use of a physical token are known. A physical token is a device which displays, when it is requested, a sequence of characters. A physical token is associated with a user account. During the authentication, a user enters:
  their identifier,
  their password,
  a sequence of characters produced by the physical token.

Authentication is therefore guaranteed by the knowledge of a first secret and enhanced by the possession of a device: the physical token.

This enhanced authentication is one of the most secure methods that currently exists. However, it still has some disadvantages.

This authentication mode requires that you have a device dedicated to the production of the sequence of characters on hand at all times. To reduce its size and ensure its durability, such a device is usually equipped with a very small and unlit display. These features make it difficult to read the sequence of characters. In addition, also for security reasons, the sequence of characters remains displayed for a limited time and is only valid for a limited time. Therefore, it is not easy to use such a physical token.

Another major problem with such physical tokens is that they must remain synchronized with a server dedicated to the management of tokens. Thus, if the token is inadvertently requested outside of an attempted session initiation, the token may be out of sync and make any subsequent connection attempt impossible.

In addition, the most immediate disadvantage is that three pieces of information must be entered to provide authentication.

Another problem to allow for enhanced authentication is that the means used to carry out this authentication must not be compromised. Therefore, sufficient information for authentication should not be collected or intercepted.

DISCLOSURE OF THE INVENTION

The invention aims to resolve all or some of the problems of the prior art identified above, and in particular to propose means to provide enhanced authentication by possessing a third-party device while eliminating the steps of entering authentication information.

The invention also proposes the use of public means to provide this authentication, while ensuring that authentication data are not compromised.

Public means are to be understood as means that are not on the same network as the resources which the user authenticating themselves wishes to access. The first of these resources is an authentication server. Here, this concept of a network can be understood as a topological or legal concept. In the case of a legal concept, two different networks are two networks that are not managed by the same legal entities. An authentication server manager refers to an external server.

To this end, one aspect of the invention relates to a method for initiating a secure session on a computer terminal connected to an authentication server, characterized in that the initiating of the session is carried out by implementing at least one of the following steps:

Transmission, by the authentication server, of a downward notification to a mobile terminal, through a real-time notification server, the downward notification comprising a set of authentication data including at least one session key, the authentication data being encrypted using asymmetric encryption, a public key being known to the authentication server, a private key being known only to the mobile terminal, the private key being associated with the public key;

Transmission, by the mobile terminal, of an upward notification to an authentication server, through the real-time notification server, the upward notification comprising a sub-set of the authentication data, at least this sub-set of authentication data being encrypted using symmetric encryption using at least the session key as the key;

Verification, by the authentication server, of the conformity of the authentication data included in the upward notification compared to the transmitted authentication data included in the downward notification;

Authorization of the initiating of the session in the event of successful verification In addition to the main features mentioned in the previous paragraph, the method/device according to the invention may have one or more of the following additional features, considered individually or in the technically possible combinations:

the notifications transmitted to the authentication server are routed through an intermediate server.

the intermediate server is an XMPP server.

the real-time notification server is public.

the authentication data comprise a user identifier and a one-time password.

the public key and the private key are produced by the mobile terminal during an enrollment phase of the mobile device on the authentication server.

the enrollment phase is carried out by implementing at least one of the following steps:

acquisition (4000), by the mobile terminal, of:

an enrollment key;

an authentication server identifier;

a user identifier, and;

configuration data for communication with the real-time notification server;

transmission (4010), by an enrollment tool, of a message to the authentication server, this message comprising:

the user identifier;

the enrollment key;

production (4030), by the mobile terminal, of the public key and the private key;

transmission, by the mobile terminal, of an upward notification to the authentication server, the upward notification comprising at least:

the user identifier and the public key encrypted using the enrollment key, as well as;

the user identifier;

the authentication server identifier.

enrollment by the authentication server.

the user identifier is a temporary identifier associated with a permanent identifier.

the acquisition step is carried out by reading a QR code.

BRIEF DESCRIPTION OF THE FIGURES

Other features and advantages of the invention will emerge from reading the following description, with reference to the attached figures, wherein.

For greater clarity, identical or similar elements are identified by identical reference symbols in all the figures where they appear.

The invention will be better understood by reading the following description and examining the accompanying figures. These are presented for information purposes only and in no way limit the invention.

DETAILED DESCRIPTION

Figure 1:
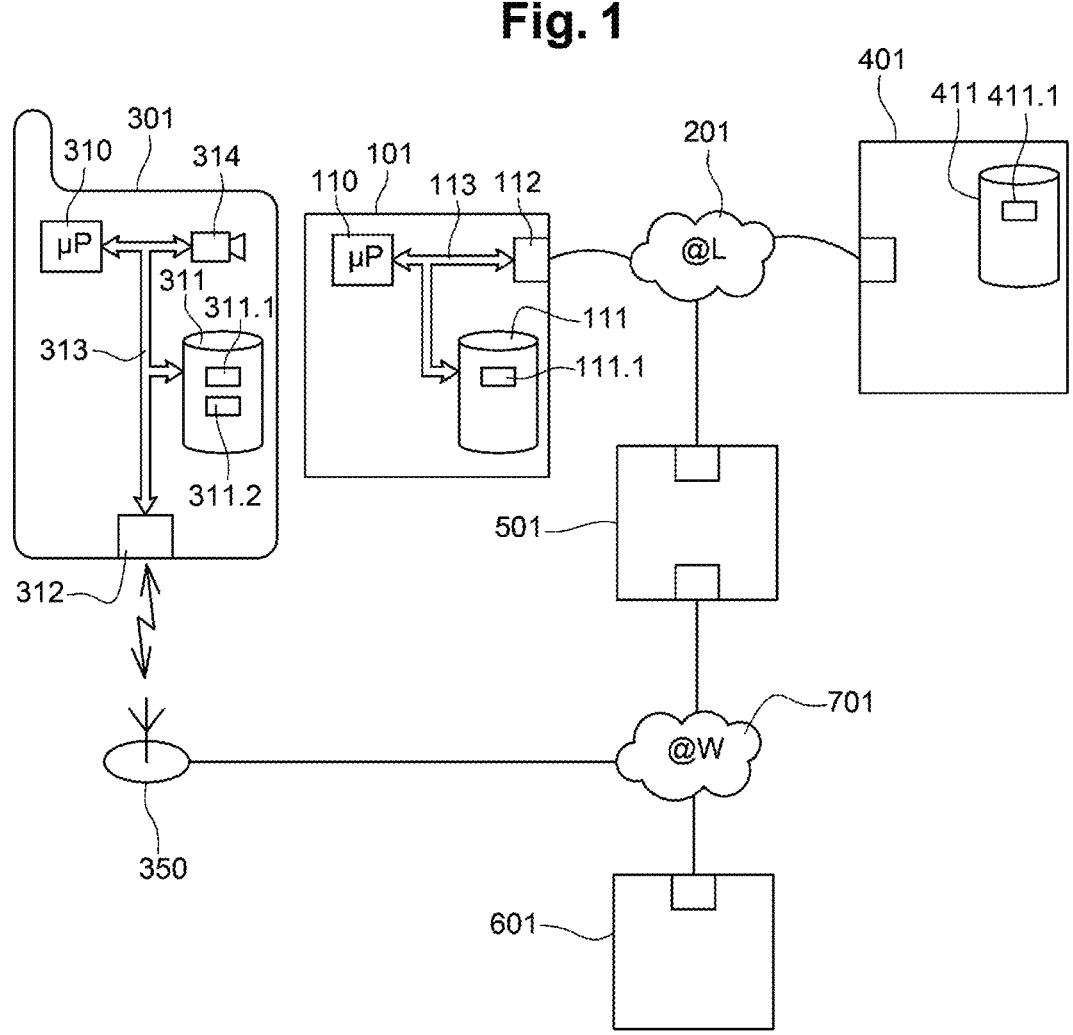
FIG. 1: shows an illustration of technical means allowing the implementation of the method according to the invention.

FIG. 1 shows an illustration of technical means allowing the implementation of the method according to the invention.

Figure 2:
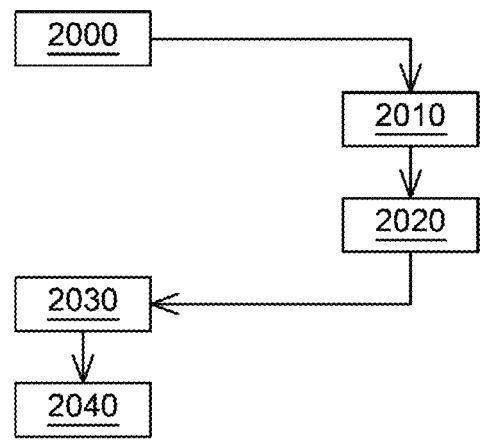
FIG. 2: shows an illustration of a step of the method according to the invention.

FIG. 2 shows an illustration of a step of the method according to the invention.

Figure 3:
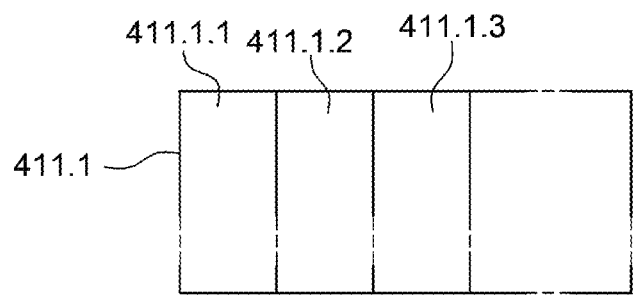
FIG. 3: shows an illustration of an enrichment of a user database of an authentication server.

FIG. 3 shows an illustration of an enrichment of a user database of an authentication server.

Figure 4:
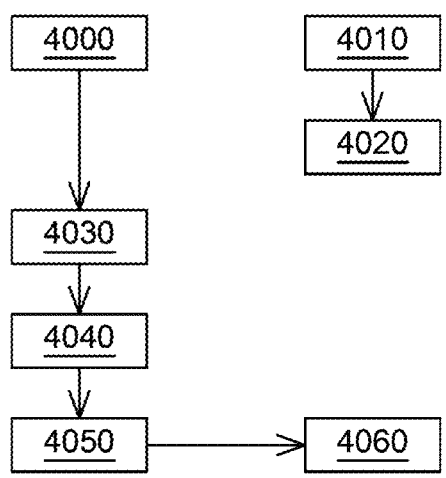
FIG. 4: shows an illustration of a step of the method according to the invention for the enrollment of a mobile device.

FIG. 4 shows an illustration of a step of the method according to the invention for the enrollment of a mobile device.

FIG. 1 shows a technical infrastructure, wherein the invention may be implemented. FIG. 1 shows a computer terminal 101 to which a user must connect to access resources of the computer terminal or via the computer terminal.

Some resources of the computer terminal are, for example:

local storage resources, these being a hard disk or other resources, processing capacities, software, also referred to as applications, a network connection providing access to resources through a local area network 201 to which the computer terminal is connected;

. . . ; this list is not exhaustive.

The term "hard drive" refers to a medium of mass storage. Therefore, this may be a local hard disk, a network, an array of disks, etc. The list is not exhaustive.

FIG. 1 shows that the computer terminal 101 comprises at least a microprocessor 110, storage means 111, for example a hard disk, a network interface 112, for example an Ethernet card.

The microprocessor of the computer terminal, the storage means of the computer terminal and the network interface of the computer terminal are interconnected via a bus 113.

When an action is attributed to a device, it is actually performed by a microprocessor of the device controlled by instruction codes stored in a memory of the device. If an action is attributed to an application, it is actually performed by a microprocessor of the device in a memory in which the instruction codes corresponding to the application are stored. Thus, all the described steps are implemented by a microprocessor.

As described, the computer terminal 101 is able to receive and transmit messages via its network interface. It is the network interface 112 of the computer terminal 101 that allows its connection to the local area network 201.

FIG. 1 shows that the storage means 111 of the computer terminal 101 comprise at least:

a zone 111.1 comprising instruction codes corresponding to a part of the implementation of the method according to the invention.

FIG. 1 also shows a smartphone-type mobile terminal 301. A smartphone is also referred to as an intelligent phone. This also includes tablets.

FIG. 1 shows that the mobile terminal 301 comprises at least:

a microprocessor 310;

storage means 311, for example a flash memory;

a camera 314, at least one network interface 312, for example a mobile-phone-type radio module (GSM, GPRS, UMTS, LTE, . . . ), a WiFi radio module, and/or a Bluetooth radio module; this list is not exhaustive.

The microprocessor of the mobile terminal 301, the storage means of the mobile device, the camera of the mobile device and the network interface of the mobile device are interconnected via a bus 313.

FIG. 1 shows that the storage means of the mobile device comprise:

a zone 311.1 comprising instruction codes corresponding to a part of the implementation of the invention;

a zone 311.2 to configure to record a private key.

FIG. 1 also shows:
an authentication server 401;
a proxy server 501;
a real-time notification server 601.

The authentication server 401, the proxy server 501 and the real-time notification server 601 are processing devices configured to carry out actions. Their composition shall be described only in terms of the means useful for understanding the invention.

FIG. 1 shows that the authentication server 401 comprises storage means 411. The storage means of the authentication server 401 comprise a user database zone 411.1. Such a database is, for example, an LDAP (lightweight directory access protocol) directory. For the invention, this database is enriched to make it possible to associate a user 411.1.1 referenced in the database with at least the following information:
an identifier 411.1.2 for a real-time notification service. A notification address is also referred to. This is a user identifier for the notification server. This may also be a device ID, as a given user may have several devices;
a public key 411.1.3.

A server is a device able to receive messages, via a communication protocol, and to transmit a message in response to the message received. For simplicity of the description, the servers are represented as devices in their own right. However, in practice, it is quite possible that the same physical device can host several services and can therefore be designated as the server of a first service and the server of a second service.

FIG. 1 shows that the computer terminal 101, the authentication server 401 and the proxy server 501 are connected to the same local area network 201. They can therefore communicate with each other.

FIG. 1 also shows that:
the proxy server 501 is connected to a public network 701, for example, the Internet;
the server 601 is connected to the public network 701;
the mobile terminal 301 is connected to an access point 350, which is itself connected to the public network 701. The access point 350 is, for example, a base station of a mobile phone network, or a WiFi access point.

FIG. 1 shows the fact that the public servers are the proxy server 501 and the real-time notification server 701: these two servers are directly accessible to any device connected to the public network 701.

A real-time notification server is a server that makes it possible to push notifications to clients. In the invention, clients of such a server are at least the mobile terminal and the authentication server. In one variant of the invention, the authentication server is a client through the proxy server. It is also said that the proxy server is an intermediate server. Such an intermediate server has a plurality of roles: protection, load management, transcoding, In one variant of the invention, the proxy server is a so-called XMPP server which carries out transcoding between the real-time notification server, for which it is the native protocol and the authentication server. Thus, it is possible to implement the solution according to the invention without having a major impact on an existing infrastructure.

In another variant of the invention, the proxy server is an XMPP server and a load manager. It is thus possible to manage a large number of secure session initiation requests.

In one implementation of the invention, it is possible to use as a real-time notification the "Google Cloud Messaging" service (registered trademark), its successor "Firebase Cloud Messaging" (registered trademark) or APNs "Apple Push Notification service" (registered trademark).

FIG. 2 shows a step 2000 of transmission, by the authentication server 401, of a downward notification to the mobile terminal. This notification is an enhanced authentication request. The mobile terminal is associated with a user in the user database of the authentication server. This association is carried out, for example, via the identifier 411.1.2 for a real-time notification service.

In practice, the transmission step is triggered by a user action on the computer terminal. This action is a session initiation attempt.

To transmit this enhanced authentication request, the authentication server produces a set of authentication data. These authentication data comprise at least one authentication session key. In one advantageous variant of the invention, the authentication data set also comprises data from the following:
a user identifier for the authentication server;
a one-time password;
an authentication server identifier.

The session key is produced on request and is associated with the user identifier, for example via the user database.

Once these authentication data have been produced, the authentication server 401 encrypts them with the public key associated with the user and transmits them to the mobile terminal 301 via the proxy server 501 and the real-time notification server 601. This is a downward notification to the mobile terminal. It is also said that the real-time notification server pushes the notification to the mobile terminal. The destination address used for the transmission of this notification is the user identifier for the notification server associated with the user in the user database of the authentication server.

Usually, the transmission direction of notifications is considered from the point of view of mobile terminals. A downward notification is received by a mobile terminal. An upward notification is transmitted by a mobile terminal. For an upward notification, we also speak of "upstream" notification.

In a step 2010 of receiving the upward notification, the mobile terminal receives the notification of the authentication request transmitted by the authentication server. In this step, the mobile terminal uses the private key 311.2 to decrypt the content of the notification received.

In one variant of the invention, access to the private key and/or its use is subject to unlocking. Such unlocking is, for example, achieved by entering a PIN code, a fingerprint, a retinal scan or facial recognition.

After the step 2010 of receiving the upward notification, the mobile terminal produces a response, an authentication notification, by using the data contained in the set of authentication data. In the example in the description, the mobile terminal produces a notification, the encrypted content of which is:
the user identifier for the authentication server;
the one-time password.

The encryption is achieved by using a symmetric encryption algorithm. The key used to carry out this encryption is the session key. The authentication notification also comprises, in clear text, the user identifier. Once it has been produced, the authentication notification is transmitted (2020) to the authentication server via the real-time notification server. The recipient of the authentication notification is the server identified by the "server ID authentication" in the authentication data set. In practice, this is translated by the fact that the real-time notification server will send the notification to the proxy server. The proxy server formulates the notification and transmits it to the authentication server.

In a step 2030 the authentication server 501 receives a response to the notification transmitted in the step 2000 of transmitting an enhanced authentication request. This response is the authentication notification transmitted by the mobile terminal. This response comprises a user identifier in clear text which allows the authentication server to find a user record in the user database, or in a memory zone dedicated to the management of this message exchange. Thanks to this record, the authentication server can find the session key and decrypt the encrypted content of the response. The authentication server may then perform a verification operation by verifying that the one-time password conforms, is identical to the one transmitted in the notification of the enhanced authentication request.

If the password matches then, in a step 2040, the authentication server then transmits an authorization to initiate the session. It is then said that the verification operation has been successful.

In practice, the authentication server transmits an authentication request following a request. Such a request is, for example, an action of a user on the computer terminal. Such an action is, for example:
entering an identifier to initiate a session;
waking up from a standby state;
... the list is not exhaustive.

A user of a computer terminal therefore starts their unlocking action as in the prior art but, thanks to the invention, they carry this out via their mobile phone, which acts as a physical token and provides strong authentication. The invention also makes it possible to use a public infrastructure to initiate a session on a private domain without compromising the authentication data.

FIG. 4 shows a step 4000 of acquisition, wherein the mobile terminal acquires data for its enrollment. These data are:
an enrollment key;
an authentication server identifier;
a user identifier for the authentication server;
configuration data for communication with the real-time notification server. These data are the information required to be able to use the notification server to transmit and receive notifications. These data are:
a notification server identifier;
an application identifier for the notification server.

These data are acquired, for example, by scanning a QR code. The QR code is displayed, for example, by a screen of the computer terminal following a request by a user of the computer terminal. Such a request is the same type as that already described. In a preferred variant, the QR code is displayed after unlocking the computer terminal. This unlocking is carried out according to the prior art or according to the invention by using a mobile terminal that has already been enrolled.

FIG. 4 also shows a step 4010, wherein the device displaying the QR code transmits to the authentication server a pre-enrollment message containing at least the user identifier for the authentication server and the enrollment key as contained in the QR code. This message is transmitted using a secured communication interface such as the SSPI.

FIG. 4 shows a step 4020, wherein the authentication server receives the pre-enrollment message and associates, for example in the user database, the user identifier and the enrollment key. This association may also be carried out in a temporary database dedicated to this use.

FIG. 4 shows a step 4030, following the step of acquisition, wherein the mobile terminal produces a key pair. The fact that a private key is said to be associated with a public key means that the two keys form a key pair for an asymmetric encryption algorithm.

Once the key pair has been produced, the mobile terminal stores the private key in the zone 311.2. This private key is only known by the mobile terminal. This means that it is not able to be transmitted or used by another device. This private key is, ideally, recorded in a digital safe or cryptographic component of the mobile terminal. In other words, the private key never leaves the mobile terminal.

Once the key pair has been produced, the mobile terminal produces an enrollment notification, the encrypted content of which comprises:
the public key;
the user identifier for the real-time notification server.

The encrypted content is encrypted with the enrollment key. The enrollment notification comprises, in clear text, the user identifier for the authentication server.

Once the enrollment notification has been produced, it is transmitted (4050) to the authentication server by using the information contained in the QR code.

In a step 4060, the authentication server receives an enrollment notification. This notification is associated with a user of the authentication server. The authentication server can therefore find an enrollment key and use it to decrypt the encrypted content of the enrollment notification. If the decryption succeeds, the authentication server then associates the following with the user in the user database:
the public key contained in the enrollment message;
the identifier for the notification server. This identifier corresponds to the transmitter of the enrollment notification.

From this moment, the authentication server is able to use the mobile terminal as a physical token.

The invention therefore uses the computer terminal as enrollment tools.

In one variant of the invention, for the enrollment a temporary user identifier or enrollment token is used. This is an identifier which is temporarily associated with a user in the user database. This prevents a real user identifier for the authentication server from being circulated in clear text. This temporary identifier is managed as the enrollment key. It is therefore transmitted with the enrollment key.

Once the enrollment has been completed, the mobile terminal may be used as a physical token in an enhanced authentication. In one variant, once the enrollment has been completed, the server transmits a message allowing the computer terminal to display a return message relating to an enrollment. This message may also be sent to the mobile terminal via a notification.

It should be noted that the enrollment concerns the user of the mobile terminal and/or the mobile terminal itself. The element that is associated with the user of the authentication server is an identifier for the notification server, i.e. an identifier that allows the mobile device to receive real-time notifications. Such an identifier depends on the real-time notification service used. An enrollment, in the sense of the invention is therefore equivalent to allowing the authentication server to send secure notifications to a mobile terminal of the user.

It should be noted that, thanks to the invention, no sensitive data is accessible to the real-time notification server. The authentication is therefore secure and enhanced even if public real-time notification servers are used.

What is claimed is:

1. A method for initiating a secure session on a computer terminal connected to an authentication server, the method comprising:

transmitting, by the authentication server, a downward notification to a mobile terminal, through a real-time notification server, the downward notification is an enhanced authentication request comprising a set of authentication data including at least one session key,
wherein said transmitting of the downward notification to the mobile terminal by the authentication server is triggered by a user action on the computer terminal, wherein the user action is a session initiation attempt,
wherein the mobile terminal is connected to the computer terminal and the authentication server via an access point,
wherein the enhanced authentication request comprising the set of authentication data further comprises a user identifier for the authentication server and a one-time password,
wherein the set of authentication data is encrypted using a public key known to the authentication server associated with a private key known only to the mobile terminal,
wherein the at least one session key is produced on request and is associated with the user identifier via a user database;

transmitting, by the mobile terminal, an upward notification to the authentication server, through the real-time notification server, the upward notification comprising the user identifier and the public key encrypted using an enrollment key after the user identifier and the enrollment key are acquired by reading a QR code that is displayed by a screen of the computer terminal and further comprising a sub-set of the set of authentication data, at least the sub-set of the set of authentication data being encrypted using symmetric encryption using at least the at least one session key,
wherein the mobile terminal receives the upward notification and decrypts contents of the upward notification using the private key,
wherein the mobile terminal produces an authentication notification response using the sub-set of the set of authentication data, the sub-set of the set of authentication data being encrypted with the user identifier for the authentication server and the one-time password as encrypted content,
wherein the authentication notification response comprises in clear text the user identifier;

transmitting the authentication notification response to the authentication server via the mobile terminal;

receiving, by the authentication server, the authentication notification response that is transmitted which comprises the user identifier in clear text to allow the authentication server to find a user record in the user database;

decrypting the encrypted content of the authentication notification response using the at least one session key, wherein the authentication server finds the at least one session key via the user record;

verifying, by the authentication server, a conformity of the sub-set of the set of authentication data included in the upward notification compared to the set of authentication data that is transmitted and included in the downward notification, wherein said verifying comprises verifying that the one-time password encrypted in the upward notification conforms to the one-time password of the enhanced authentication request of the downward notification;

authorizing the initiating of the secure session on the computer terminal when said verifying is successful and when said one-time password encrypted in the upward notification matches the one-time password of the enhanced authentication request of the downward notification, such that the mobile terminal is used as a physical token in an enhanced authentication.

2. The method for initiating a secure session according to claim 1, wherein the downward notification and the upward notification that are transmitted to the authentication server are routed through an intermediate server.

3. The method for initiating a secure session according to claim 2, wherein the intermediate server is an XMPP server.

4. The method for initiating a secure session according to claim 1, wherein the real-time notification server is public.

5. The method for initiating a secure session according to claim 1, wherein the public key and the private key are produced by the mobile terminal during an enrollment phase of the mobile terminal on the authentication server.

6. The method for initiating a secure session according to claim 5, wherein the enrollment phase is carried out by implementing at least one of:
acquiring, by the mobile terminal, of
an authentication server identifier;
configuration data for communication with the real-time notification server;
transmitting, by an enrollment tool, a message to the authentication server, the message comprising
the user identifier;
the enrollment key;
producing, by the mobile terminal, the public key and the private key;
transmitting, by the mobile terminal, the upward notification to the authentication server, the upward notification further comprising
the user identifier;
the authentication server identifier;
enrolling by the authentication server, such that the mobile terminal is used as the physical token.

7. The method for initiating a secure session according to claim 6, wherein the user identifier is a temporary identifier associated with a permanent identifier, to prevent a real user identifier for the authentication server from being circulated in clear text, and wherein the temporary identifier is managed as the enrollment key and is transmitted with the enrollment key.

* * * * *